(12) United States Patent
Akasaka et al.

(10) Patent No.: US 10,050,738 B1
(45) Date of Patent: Aug. 14, 2018

(54) LOW NOISE COLORLESS, DIRECTIONLESS, CONTENTIONLESS RECONFIGURABLE OPTICAL ADD/DROP MULTIPLEXER

(71) Applicant: Fujitsu Limited, Kawasaki-shi, Kanagawa (JP)

(72) Inventors: Youichi Akasaka, Allen, TX (US); Takeshi Hoshida, Kawasaki (JP); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/412,872

(22) Filed: Jan. 23, 2017

(51) Int. Cl.
*H04J 14/02* (2006.01)
*H04Q 11/00* (2006.01)

(52) U.S. Cl.
CPC ...... *H04J 14/0212* (2013.01); *H04Q 11/0005* (2013.01); *H04Q 2011/0016* (2013.01); *H04Q 2011/0049* (2013.01)

(58) Field of Classification Search
CPC combination set(s) only.
See application file for complete search history.

(56) References Cited

U.S. PATENT DOCUMENTS

| | | | |
|---|---|---|---|
| 2010/0329686 A1* | 12/2010 | Frankel | H04B 10/25253 398/83 |
| 2014/0369679 A1* | 12/2014 | Vassilieva | H04B 10/2572 398/26 |
| 2015/0036210 A1* | 2/2015 | Asobe | G02F 1/39 359/341.3 |

* cited by examiner

*Primary Examiner* — David Payne
*Assistant Examiner* — Omar S Ismail
(74) *Attorney, Agent, or Firm* — Baker Botts L.L.P.

(57) ABSTRACT

Methods and systems for implementing a low noise CDC ROADM include incorporating individual stages of an optical PSA before and after WSSs included in the CDC ROADM. The WSSs may be used to route the pump and idler signals, as well as to perform phase tuning for optimal phase-sensitive amplification.

12 Claims, 5 Drawing Sheets

US 10,050,738 B1

LOW NOISE COLORLESS, DIRECTIONLESS, CONTENTIONLESS RECONFIGURABLE OPTICAL ADD/DROP MULTIPLEXER

BACKGROUND

Field of the Disclosure

The present disclosure relates generally to optical communication networks and, more particularly, to low noise colorless, directionless, contentionless reconfigurable optical add/drop multiplexers.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

Optical networks may also include various optical elements, such as amplifiers, dispersion compensators, multiplexer/demultiplexer filters, wavelength selective switches (WSS), optical switches, couplers, etc. to perform various operations within the network. In particular, optical networks may include costly optical-electrical-optical (O-E-O) regeneration at colorless, directionless, contentionless reconfigurable optical add-drop multiplexers (CDC ROADMs) when the reach of an optical signal is limited in a single optical path.

As data rates for optical networks continue to increase, reaching up to 1 terabit/s (1 T) and beyond, the demands on optical signal-to-noise ratios (OSNR) also increase, for example, due to the use of advanced modulation formats, such as QAM and PSK with dual polarization. In particular, noise accumulations resulting from cascading of optical amplifiers in an optical network operating at very high data rates may limit the reach of an optical signal at a desired level of OSNR and may result in an increased number of O-E-O regenerations, which is economically disadvantageous.

SUMMARY

In one aspect, a disclosed method for operating ROADMs in optical transport networks includes receiving an input wavelength division multiplexing (WDM) optical signal at an input degree of a ROADM, and transmitting the input WDM optical signal through a phase sensitive amplifier (PSA) stage I. In the method, the PSA stage I may include a first non-linear optical element (NLE) through which the input WDM optical signal and a first pump wavelength are passed to generate a PSA stage I optical signal comprising the input WDM optical signal, the first pump wavelength, and an idler signal. The method may also include transmitting the PSA stage I optical signal through a first wavelength selective switch (WSS), and receiving wavelengths for a PSA stage II optical signal at a second WSS, the PSA stage II optical signal comprising wavelengths included in an output WDM optical signal, the first pump wavelength, and corresponding idler signals. The method may further include, subsequent to the second WSS, transmitting the PSA stage II optical signal to a PSA stage II. In the method, the PSA stage II may include a second NLE through which the PSA stage II optical signal is amplified to generate the output WDM optical signal.

In any of the disclosed embodiments, the method may further include passing the PSA stage II optical signal through an optical band pass filter to remove the pump wavelength and the idler signals to isolate the output WDM optical signal, and transmitting the output WDM optical signal through an output degree of the ROADM.

In any of the disclosed embodiments of the method, the output degree of the ROADM may be a drop port.

In any of the disclosed embodiments of the method, the input degree of the ROADM may be an add port.

In any of the disclosed embodiments, the method may further include using the first WSS to phase tune the PSA stage I optical signal. In the method, respective phases of the input WDM optical signal, the pump wavelength, and the idler signal may be aligned.

In any of the disclosed embodiments of the method, the respective phases may be aligned based on a feedback signal from an optical channel monitor monitoring the output WDM optical signal.

In any of the disclosed embodiments, the method may further include, at the PSA stage II, prior to the second NLE, transmitting the PSA stage I signal through a third NLE through which a second pump wavelength is counterpropagated. In the method, the third NLE and the second pump wavelength may perform Raman amplification on the PSA stage I signal.

In a further aspect, a disclosed ROADM includes a phase sensitive amplifier (PSA) stage I to receive an input wavelength division multiplexing (WDM) optical signal at an input degree of the ROADM. In the ROADM, the PSA stage I may include a first non-linear optical element (NLE) through which the input WDM optical signal and a first pump wavelength are passed to generate a PSA stage I optical signal comprising the input WDM optical signal, the first pump wavelength, and an idler signal. The ROADM may further include a first wavelength selective switch (WSS) cross connect comprising a first WSS enabled to receive the PSA stage I optical signal, and a second wavelength selective switch (WSS) cross connect comprising a second WSS enabled to receive a PSA stage II optical signal, the PSA stage II optical signal comprising wavelengths included in an output WDM optical signal, the first pump wavelength, and corresponding idler signals. The ROADM may still further include a PSA stage II to receive the PSA stage II optical signal. In the ROADM, the PSA stage II may include a second NLE through which the PSA stage II optical signal is amplified to generate the output WDM optical signal.

In any of the disclosed embodiments, the ROADM may further include an optical band pass filter through which the PSA stage II optical signal is passed through after the PSA stage II to remove the pump wavelength and the idler signals to isolate the output WDM optical signal at an output degree of the ROADM.

In any of the disclosed embodiments of the ROADM, the output degree of the ROADM may be a drop port.

In any of the disclosed embodiments of the ROADM, the input degree of the ROADM may be an add port.

In any of the disclosed embodiments of the ROADM, the first WSS may be used to phase tune the PSA stage I optical signal. In the ROADM, respective phases of the input WDM optical signal, the pump wavelength, and the idler signal may be aligned.

In any of the disclosed embodiments of the ROADM, the respective phases may be aligned based on a feedback signal from an optical channel monitor monitoring the output WDM optical signal.

In any of the disclosed embodiments, the ROADM may further include a third NLE at the PSA stage II, prior to the second NLE, receiving the PSA stage I signal and receiving a second pump wavelength in a counterpropagating direction to the PSA stage I signal. In the ROADM, the third NLE and the second pump wavelength may perform Raman amplification on the PSA stage I signal.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
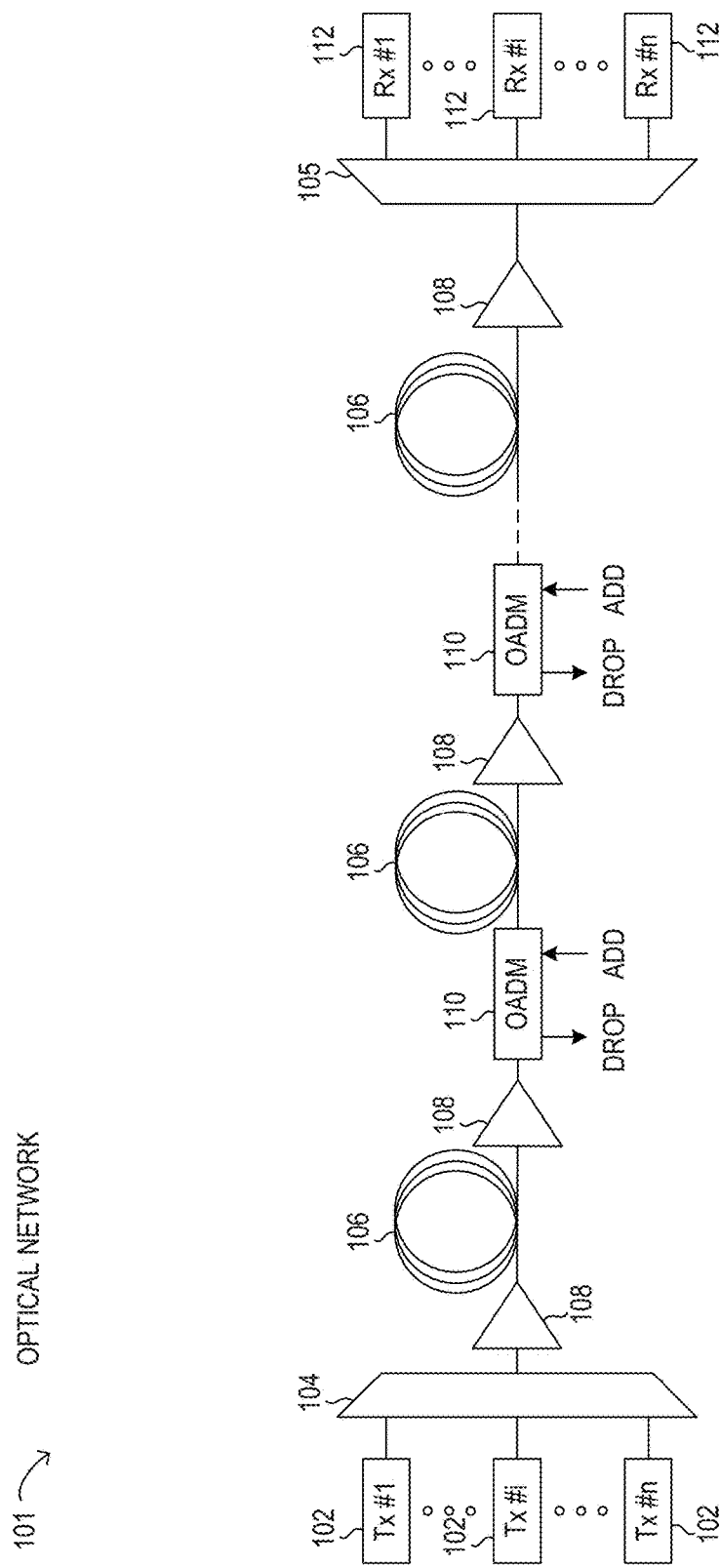
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (see also FIG. 2) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, as data rates approach 1 T and beyond, a correspondingly high OSNR becomes desirable to maintain economic feasibility by avoiding excessive numbers of O-E-O regenerators. One source of OSNR reduction is the noise accumulation resulting from cascaded optical amplifiers 108 at various points in the transmission path. For an optical amplifier, OSNR may be represented as a noise figure (NF), given by Equation 1, where $OSNR_{in}$ is the input OSNR, $OSNR_{out}$ is the output OSNR, and dB is decibels.

$$NF=10 \log (OSNR_{in}/OSNR_{out})=OSNR_{in}[dB]-OSNR_{out}[dB] \qquad \text{Equation (1)}$$

Current designs for optical amplifiers may include optical phase-sensitive amplifiers (PSA), which may exhibit a low noise figure, such as less than 3 dB in many instances. Some PSA designs may exhibit 0 dB noise figure. The lower noise figure may enable an increased optical reach for a given optical signal, which is desirable.

A typical phase-sensitive optical amplifier will have different stages, including an idler stage to initially generate an idler signal using an optical pump and an amplification stage to amplify the input signal using the optical pump and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump, and the idler signal may be separated in the intermediate stage in order to independently modulate power of each of the signals. When the separated optical paths are recombined, a phase adjustment may be performed to re-align the phase of the signals. The phase adjustment may involve an optical phase lock loop to re-align the phases of the input signal and the idler signal with the optical pump.

A CDC-ROADM may provide extensive flexibility in the operation of optical network 101. However, the CDC ROADM includes many components that inherently exhibit optical signal attenuation that is typically compensated using optical amplifier 108, which is often an EDFA. In a CDC ROADM, two WSSs are generally present on each optical path that passes through the CDC ROADM, while total attenuation losses are typically greater than about 20 dB, which is comparable to an equivalent attenuation of one entire fiber span stretching 100 km in length.

As will be described in further detail, methods and systems are disclosed herein for implementing a low noise CDC ROADM that integrates a PSA among the WSSs present in the CDC ROADM. In some embodiments, a Raman amplification stage may be also be used in the PSA integrated within the CDC ROADM. The low noise CDC ROADM disclosed herein integrates a PSA by including the idler stage (also referred to as "stage I" herein) and the amplification stage (also referred to as "stage II" herein) among the components of the CDC ROADM. The low noise CDC ROADM disclosed herein may utilize the capabilities already included in the WSSs to operate the PSA integrated within the CDC ROADM, such as wavelength-selective switching and phase matching functionality. The PSA described herein and integrated before and after two WSSs in the low noise CDC ROADM may also be implemented in other nodes that have at least two WSSs, such as gain equalization nodes, for example.

Figure 2:
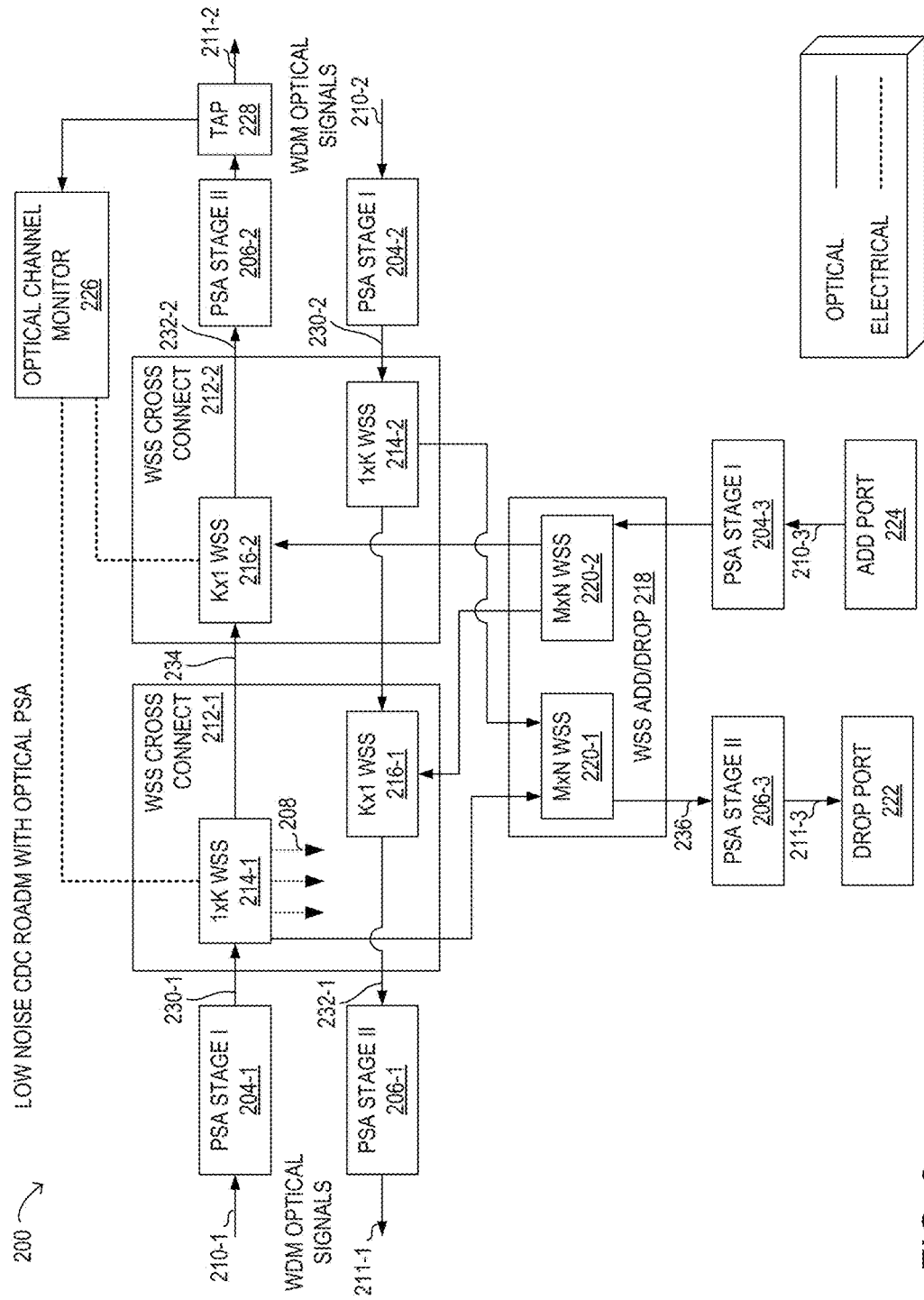
FIG. 2 is a block diagram of selected elements of an embodiment of a low noise CDC ROADM with an optical phase-sensitive amplifier.

Referring now to FIG. 2, selected elements of an example embodiment of a low noise CDC ROADM 200 with an optical PSA is shown. As shown, CDC ROADM 200 is a schematic illustration and is not drawn to scale. It will be understood that, in different embodiments, CDC ROADM 200 may be implemented with fewer or more components than illustrated in FIG. 2. In particular, it will be understood that CDC ROADM 200 may be expanded by adding additional input and output degrees, as well as additional add ports and drop ports, for use in optical networks of different sizes, topographies, and complexity. For example, additional output degrees 208 shown with WSS 214-1 may be used for expanding the capacity of CDC ROADM 200 and it will be understood that corresponding additional input and output degrees may be used to extend the capacity of CDC ROADM 200. Although not shown in FIG. 2 for descriptive clarity, additional output degrees, such as output degrees 208, may also be used with WSS 214-2.

In FIG. 2, CDC ROADM 200 operates by transmitting WDM optical signals in an optical network, such as optical network 101 (see FIG. 1). Specifically, CDC ROADM 200 may receive WDM input signal 210-1 in one direction of propagation, and simultaneously receive WDM input signal 210-2 in the counterpropagating direction from the same optical path. Additionally, CDC ROADM 200 includes drop port 222, where wavelengths in WDM input signal 210-1, 210-2 (comprising one or more channels or wavelengths) may be dropped and output as WDM output signal 211-3, as well as add port 224 where wavelengths in WDM input signal 210-3 may be added to WDM output signals 211-1, 211-2. Thus, add port 224 and drop port 222 may respectively add/drop WDM optical signals in either one of the propagation directions. Because of the CDC nature of CDC ROADM 200, it will be assumed that CDC ROADM 200 can internally resolve any wavelength conflicts that may arise during adding of WDM optical signals, for example by shifting wavelengths using an O-E-O converter, or other means (not shown). Then, CDC ROADM 200 may output amplified WDM output signal 211-2 in one direction of propagation, and simultaneous output amplified WDM output signal 211-1 in the counterpropagating direction.

Accordingly, various wavelengths in WDM input signals 210 are received by CDC ROADM 200 and may be directly transmitted to amplified WDM optical signals 211. Some wavelengths in WDM input signals 210 may be dropped by CDC ROADM 200 from the optical path, and are available for output at drop port 222. New wavelengths may be added to amplified WDM optical signals 211 and are received at add port 224. Because CDC ROADM 200 is used to add or drop wavelengths from WDM input signals 210, amplified WDM optical signals 211 may have different wavelengths, or may have different information modulated on a given wavelength, than WDM input signals 210.

Instead of conventional optical amplifiers 108 that are used before and after a typical CDC ROADM, CDC ROADM 200 incorporates various instances of PSA stage I 204 and PSA stage II 206 along the different input and output optical paths. As a result of the configuration of CDC ROADM 200, each wavelength passes through at least two WSSs. Along each possible optical path within CDC ROADM 200, PSA stage I 204 is located prior to a first WSS, while PSA stage II 206 is located subsequent to a second WSS.

For example, as WDM input signal 210-1 is received as an input to CDC ROADM 200, PSA stage I 204-1 (idler stage) adds an optical pump and an idler signal using a first non-linear element (NLE), such as a highly non-linear fiber (HNLF) to generate a PSA stage I optical signal 230-1. Then, PSA stage I optical signal 230-1 is routed by WSS 214-1 in WSS cross connect 212-1. WSS 214-1 may be a 1×K WSS, where K is an integer number of output degrees, such as 10, 20, 40, or more output degrees, in various embodiments. One output degree 234 of WSS 214-1 may connect with WSS 216-2 (K×1 WSS) in WSS cross connect 212-2 and may transmit at least certain portions of PSA stage I optical signal 230-1, such as the optical pump, along with the wavelengths of WDM input signals 210-1 that are retained in CDC ROAM 200. Thus wavelengths in WDM input signals 210-1 that are passed through CDC ROADM 200 are routed through WSS 214-1 as the first WSS and WSS 216-2 as the second WSS. After WSS 216-2, the wavelengths that are passed through CDC ROADM 200, along with new wavelengths in WDM input signals 210-3 added at add port 224, are transmitted to PSA stage II 206-2, which includes a second NLE to perform amplification, as PSA stage II optical signal 232-2. PSA stage II optical signal 232-2 may include the optical pump along with respective idler signals that are added at PSA stage I 204-1 or 204-3.

In CDC ROADM 200, wavelengths in WDM input signals 210-1 that are to be dropped may be routed by WSS 214-1 to WSS 220-1, which may be a M×N WSS, where M and N are integer number of switchable degrees, in WSS add/drop 218. From WSS 220-1, the dropped wavelengths may be output to PSA stage II 206-3 as PSA stage II optical signals 236. PSA stage II 206-3 may output WDM output signals 211-3, comprising the dropped wavelengths, to drop port 222.

In CDC ROADM 200, wavelengths in WDM input signals 210-3 that are to be added may be received by PSA stage I 204-3. The resulting WDM input signals 210-3, along with a corresponding optical pump and idler signals, may then be routed by WSS 220-2 to WSS 216-2, for further transmission as WDM output signals 211-2, or to WSS 216-1 for further transmission as WDM output signals 211-1.

Additionally, in a substantially similar manner as described above with respect to WDM input signals 210-1, WDM input signals 210-2 may be transmitted through PSA stage I 204-2 to generate a PSA stage I optical signal 230-2. Pass through wavelengths in PSA stage I optical signal 230-2 are then switched by WSS 214-2 and WSS 216-1 to PSA stage II 206-1. Dropped wavelengths in PSA stage I optical signal 230-2 are switched by WSS 214-2 and WSS 220-1 to PSA stage II 206-3. Added wavelengths in PSA stage I optical signal 210-3 are switched by WSS 220-2 and WSS 216-1 to PSA stage II 206-1. In the counterpropagating direction (right to left on the page of FIG. 2), PSA stage II optical signal 232-1 is generated and amplified by PSA stage II 206-1 to generate WDM output signals 211-1.

Also shown in FIG. 2 is optical channel monitor 226, which may monitor information regarding WDM output signals 211. In FIG. 2, tap 228 is shown splitting WDM output signal 211-2 as an example configuration, to provide an optical input to optical channel monitor 226. Optical channel monitor 226, may monitor various properties of WDM output signal 211, such as wavelength, power, residual chromatic dispersion, polarization mode dispersion, and OSNR. Optical channel monitor 226 is shown in a feedback configuration providing electrical control signals to WSS 214-1 and WSS 216-2, to enable phase matching of various wavelengths, such as the WDM optical signals 211-2, the optical pump, and the idler signals, based on monitored optical power of WDM output signal 211-2, for example. Although optical channel monitor 226 is only depicted in the propagating direction at PSA stage II 206-2 in FIG. 2 for descriptive clarity, it will be understood that optical channel monitor 226 may also be used in the counterpropagating direction at PSA stage II 206-1, or with drop port 222, for regulation and control of WDM output signals 211. In this manner, WSSs, which are equipped with internal phase tuning capability, can have their existing capabilities leveraged to enable integration of a PSA stage I and II, as shown in FIG. 2, in CDC ROADM 200.

Figure 3:
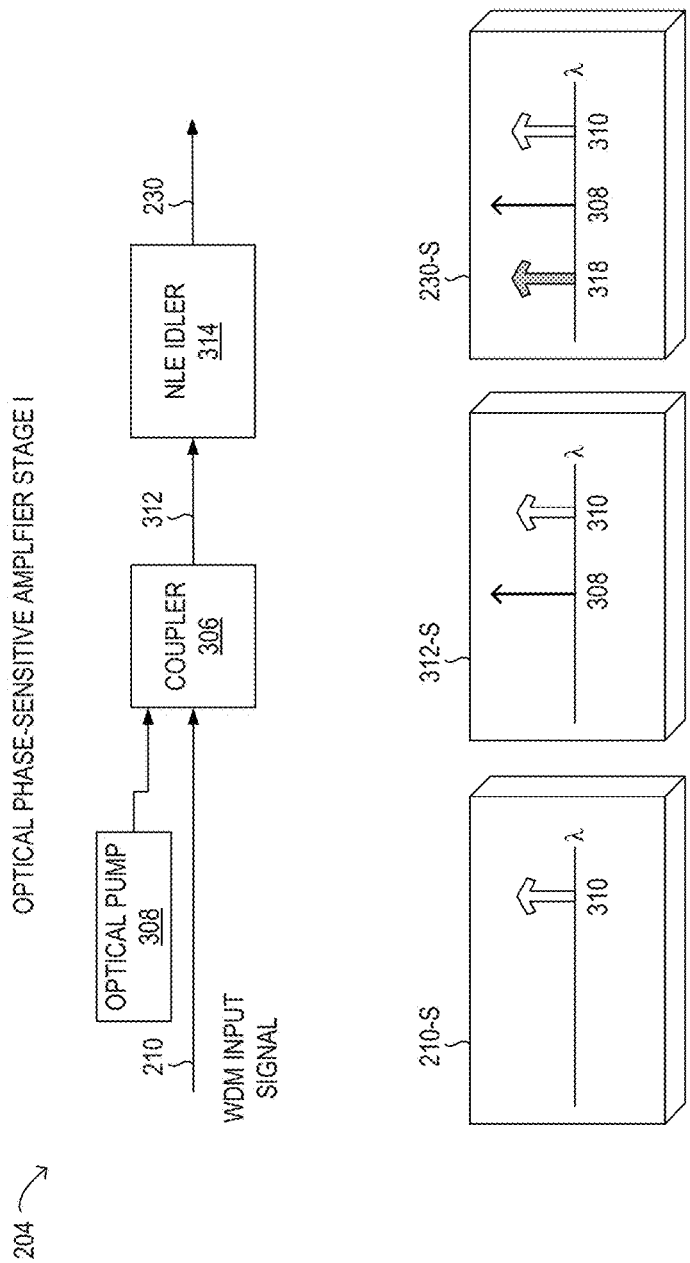
FIG. 3 is a block diagram of selected elements of an embodiment of a phase-sensitive optical amplifier stage I.

Referring now to FIG. 3, selected elements of an embodiment of an optical PSA stage I 204 are depicted. In FIG. 3, optical PSA stage I 204 is shown in a schematic representation and is not drawn to scale. It is noted that, in different embodiments, optical PSA stage I 204 may be operated with additional or fewer elements as shown in FIG. 3.

In FIG. 3, optical PSA stage I 204 receives WDM input signal 210 and adds optical pump 308 using coupler 306. Intermediate stage I signal 312, comprising WDM input signal 210 and optical pump 308 are then sent to NLE idler 314, which is a non-linear optical element. In the presence of optical pump 308 and WDM input signal 210, simple four wave mixing (FWM) may occur at NLE idler 314 to generate idler signals 318, resulting in PSA stage I optical signal 230. In PSA stage I 204, simple four wave mixing (FWM) may occur to generate so-called "idler signals", which are conjugate wavelengths of an optical signal, such as WDM optical signal 210, relative to a pump wavelength. In FWM, the idler signals appear when the optical signal and the pump wavelength are passed through a non-linear element (NLE idler 314), which may include a highly non-linear fiber (HNLF). In various embodiments, other NLEs may also be used to facilitate FWM, such as optical crystals or other optical materials. A non-linear optical element (NLE) may include a doped optical fiber, periodically poled lithium niobate (PPLN), aluminium gallium arsenide (AlGaAs) or another semiconductor material that exhibits desired optical non-linearity. In NLE idler 314, photons are converted from the pump wavelength and the optical signal to the idler signal by non-linear processes.

Also shown in FIG. 3 are spectra of the different signals transmitted in optical PSA stage I 204. In spectra 210-S, optical signal 310 represents one or more wavelengths included in WDM input signal 210. In spectra 312-S, corresponding to intermediate stage I signal 312, optical pump 308 is added to optical signal 310. In spectra 230-S corresponding to PSA stage I optical signal 230, idler signal 318 has been added, representing corresponding one or more wavelengths of optical signal 310, but spectrally spaced symmetrically with respect to optical pump 308.

Figure 4:
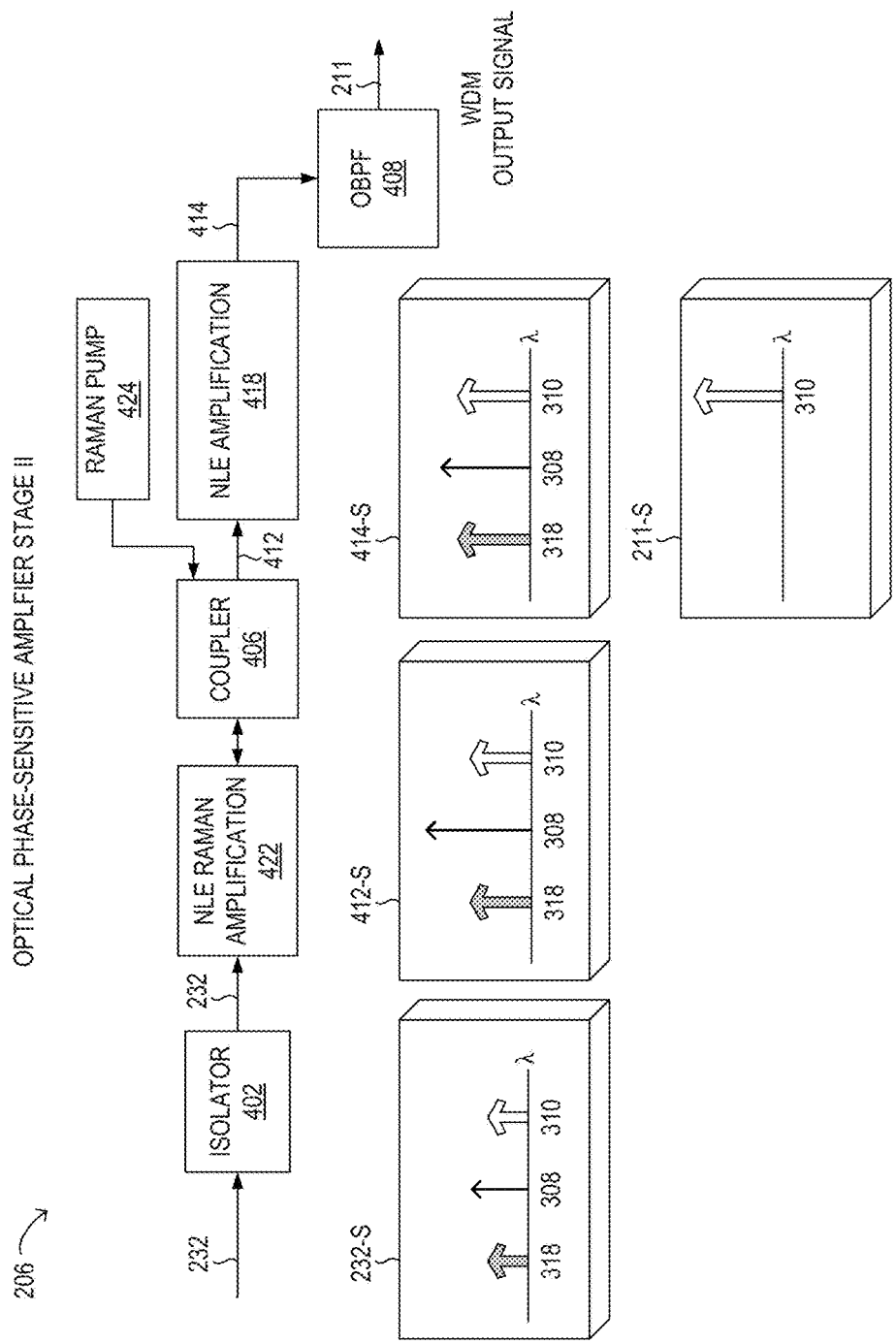
FIG. 4 is a block diagram of selected elements of an embodiment of a phase-sensitive optical amplifier stage II.

Referring now to FIG. 4, selected elements of an embodiment of an optical PSA stage II 206 are depicted. In FIG. 4, optical PSA stage II 206 is shown in a schematic representation and is not drawn to scale. It is noted that, in different embodiments, optical PSA stage II 206 may be operated with additional or fewer elements as shown in FIG. 4.

In FIG. 4, optical PSA stage II 206 receives PSA stage II optical signal 232 which is passed through isolator 402 to prevent back propagation of Raman pump 424, before sending PSA stage II optical signal 232 to NLE Raman amplification 422, which receives Raman pump 424 using coupler 406. PSA stage II optical signal 232 may include optical signal 310, which comprises the wavelengths in WDM output signal 211, as described above, along with corresponding idler signals 318 and optical pump 308. Because of the attenuation in various components of CDC ROADM 200, the signal intensity of PSA stage II optical signal 232 may be relatively low, as shown by a reduced intensity level in spectrum 232-S.

In optical PSA stage II 206, NLE Raman amplification 422 may comprise a Raman amplifier that includes Raman pump 424, which may be a laser source, that is directed through an NLE as a gain medium in a counter propagation direction to the optical signal being processed (PSA stage II optical signal 232). Raman pump 424 may be selected based on the gain medium used. For example, a 13 THz optical pump may be used with $GeO_2/SiO_2$ single mode fibers (SMF) as the NLE, while a 40 THz optical pump may be used with $P_2O_5$-doped $SiO_2$ phosphate-doped fiber (PDF) as the NLE. Furthermore, modulation or modification of the optical power of Raman pump 424 may be used to determine or modify an optical gain of NLE Raman amplification 422. It is noted that Raman amplification may be optional in some embodiments of optical PSA stage II 206, such that isolator 402, NLE Raman amplification 422, coupler 406, and Raman pump 424 may be omitted (not shown).

The output of NLE Raman amplification 422 is shown as Raman amplified optical signal 412, which is directed to NLE amplification 418, which is a non-linear optical element described above. In the presence of Raman amplified optical signal 412, one-pump four wave mixing (FWM) may occur at NLE amplification 418 to amplify the WDM optical signal and the idler signals, at the expense of optical pump 308. NLE amplification 418 may include components for performing one-pump optical four-wave mixing (FWM). The one-pump FWM may be accomplished by passing the input signal, or filtered portions thereof, through a non-linear optical element (NLE), such as a doped optical fiber, periodically poled lithium niobate (PPLN), aluminium gallium arsenide (AlGaAs) or other semiconductor material that exhibits desired optical non-linearity.

After NLE amplification 418, optical signal 414 includes the amplified WDM optical signals 310, and idler signals 318, which have increased in intensity, along with optical pump 308, which has decreased in intensity. An optical bandpass filter (OBPF) 408 may then be applied to isolate WDM output signal 214.

Also shown in FIG. 4 are spectra of the different signals transmitted in optical PSA stage II 206. In spectra 232-S, optical signal 310 represents one or more wavelengths included in WDM output signal 211, while idler signals 318 are conjugates of optical signal 310 with respect to optical pump 308. Spectra 232-S corresponds to PSA stage II optical signal 232, in which idler signals 318 have been added and which has been switched through at least two WSSs, resulting in optical power attenuation (as compared to PSA stage I optical signal 230), which is depicted by a decreased signal intensity (as compared to spectra 230-S). In spectra 412-S, corresponding to Raman amplified optical signal 412, optical signal 310, optical pump 308, and idler signals 318 are Raman amplified, and show higher intensity (as compared to spectra 232-S). In spectra 414-S, optical signal 310 and idler signals 318 are amplified by NLE amplification 418 at the expense of optical pump 308 (as compared to spectra 412-S). In spectra 211-S, optical signal 310 is isolated in amplified form by optical bandpass filter 408, which removes idler signals 318 and optical pump 308. Accordingly, spectra 211-S shows the spectrum of WDM output signal 211.

Figure 5:
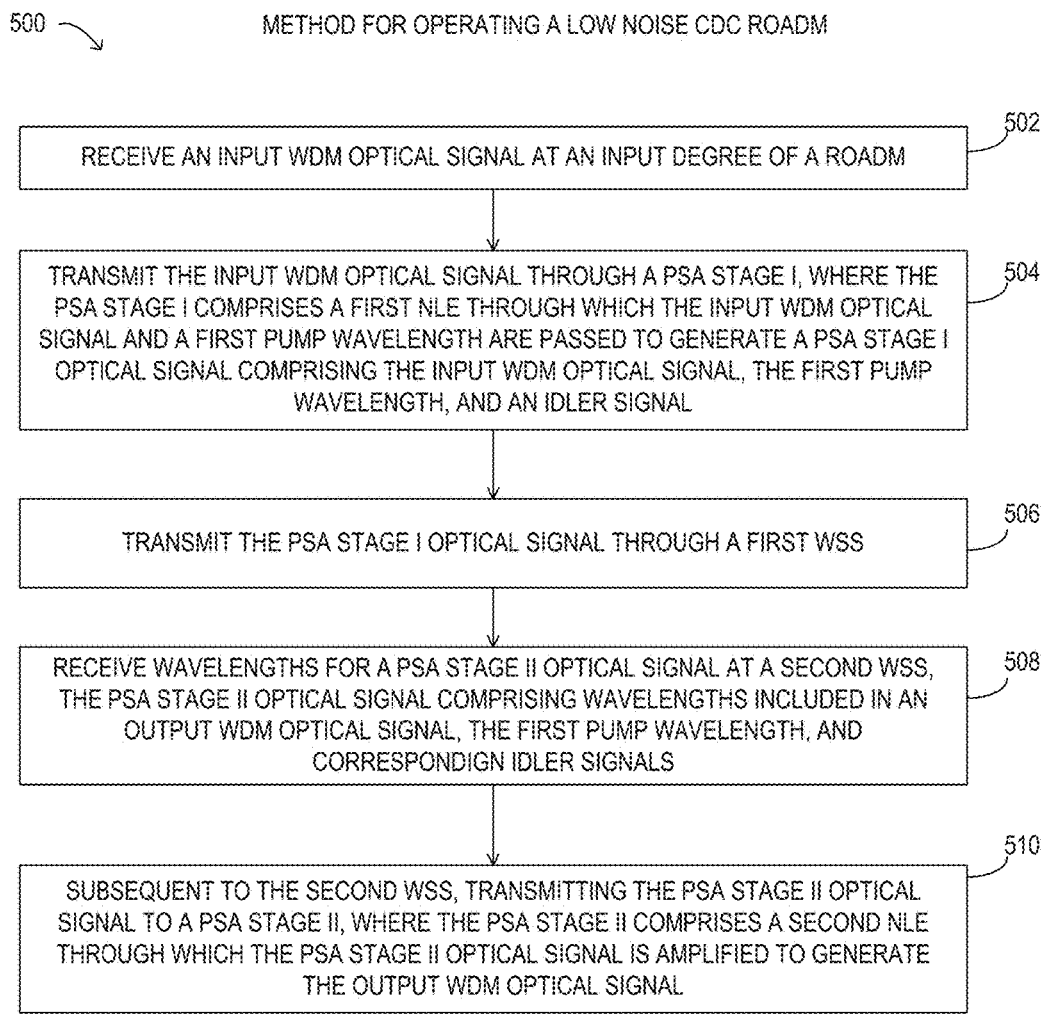
FIG. 5 is a flow chart of selected elements of a method for operating a low noise CDC ROADM.

Referring now to FIG. 5, a block diagram of selected elements of an embodiment of method 500 for operating a low noise CDC ROADM, as described herein, is depicted in flowchart form. Method 500 may be performed using CDC ROADM 200 (see FIG. 2). It is noted that certain operations described in method 500 may be optional or may be rearranged in different embodiments.

Method 500 may begin at step 502 by receive an input WDM optical signal at an input degree of a ROADM. At step 504, the input WDM optical signal is transmitted through a PSA stage I, where the PSA stage I comprises a first NLE through which the input WDM optical signal and a first pump wavelength are passed to generate a PSA stage I optical signal comprising the input WDM optical signal, the first pump wavelength, and an idler signal. At step 506, the PSA stage I optical signal is transmitted through a first WSS. At step 508, wavelengths for a PSA stage II optical signal are received at a second WSS, the PSA stage II optical signal comprising optical signal wavelengths included in an output WDM optical signal, the first pump wavelength, and corresponding idler signals. Optical signal wavelengths 310 included in output WDM optical signal 211 may include added optical signal wavelengths and may exclude dropped optical signal wavelengths, if any optical signal wavelengths are added or dropped by the ROADM from input WDM optical signal 210. If no optical signal wavelengths are added or dropped by the ROADM, optical signal wavelengths 310 included in output WDM optical signal 211 will be the same as in input WDM optical signal 210. At step 510, subsequent to the second WSS, the PSA stage II optical signal is transmitted to a PSA stage II, where the PSA stage II comprises a second NLE through which the PSA stage II optical signal is amplified to generate the output WDM optical signal.

As disclosed herein, methods and systems for implementing a low noise CDC ROADM include incorporating individual stages of an optical PSA before and after WSSs included in the CDC ROADM. The WSSs may be used to route the pump and idler signals, as well as to perform phase tuning for optimal phase-sensitive amplification.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for operating reconfigurable optical add/drop multiplexers (ROADM) in optical transport networks, the method comprising:
   receiving an input wavelength division multiplexing (WDM) optical signal at an input degree of a ROADM;
   transmitting the input WDM optical signal through a phase sensitive amplifier (PSA) stage I, wherein the PSA stage I comprises a first non-linear optical element (NLE) through which the input WDM optical signal and a first pump wavelength are passed to generate a PSA stage I optical signal comprising the input WDM optical signal, the first pump wavelength, and an idler signal;
   transmitting the PSA stage I optical signal through a first wavelength selective switch (WSS);
   receiving wavelengths for a PSA stage II optical signal at a second WSS, the PSA stage II optical signal comprising wavelengths included in an output WDM optical signal, the first pump wavelength, and corresponding idler signals;
   subsequent to the second WSS, transmitting the PSA stage II optical signal to a PSA stage II, wherein the PSA stage II comprises a second NLE through which the PSA stage II optical signal is amplified to generate the output WDM optical signal; and
   at the PSA stage II, prior to the second NLE, transmitting the PSA stage I signal through a third NLE through which a second pump wavelength is counterpropagated, wherein the third NLE and the second pump wavelength perform Raman amplification on the PSA stage I signal.

2. The method of claim 1, further comprising:
   passing the PSA stage II optical signal through an optical band pass filter to remove the pump wavelength and the idler signals to isolate the output WDM optical signal;
   transmitting the output WDM optical signal through an output degree of the ROADM.

3. The method of claim 2, wherein the output degree of the ROADM is a drop port.

4. The method of claim 1, wherein the input degree of the ROADM is an add port.

5. The method of claim 1, further comprising:
   using the first WSS to phase tune the PSA stage I optical signal, wherein respective phases of the input WDM optical signal, the pump wavelength, and the idler signal are aligned.

6. The method of claim 5, wherein the respective phases are aligned based on a feedback signal from an optical channel monitor monitoring the output WDM optical signal.

7. A reconfigurable optical add/drop multiplexer (ROADM), comprising:
   a phase sensitive amplifier (PSA) stage I to receive an input wavelength division multiplexing (WDM) optical signal at an input degree of the ROADM, wherein the PSA stage I comprises a first non-linear optical element (NLE) through which the input WDM optical signal and a first pump wavelength are passed to generate a PSA stage I optical signal comprising the input WDM optical signal, the first pump wavelength, and an idler signal;
   a first wavelength selective switch (WSS) cross connect comprising a first WSS enabled to receive the PSA stage I optical signal;
   a second wavelength selective switch (WSS) cross connect comprising a second WSS enabled to receive a PSA stage II optical signal, the PSA stage II optical signal comprising wavelengths included in an output WDM optical signal, the first pump wavelength, and corresponding idler signals;
   a PSA stage II to receive the PSA stage II optical signal, wherein the PSA stage II comprises a second NLE through which the PSA stage II optical signal is amplified to generate the output WDM optical signal; and
   a third NLE at the PSA stage II, prior to the second NLE, receiving the PSA stage I signal and receiving a second pump wavelength in a counterpropagating direction to the PSA stage I signal, wherein the third NLE and the second pump wavelength perform Raman amplification on the PSA stage I signal.

8. The ROADM of claim 7, further comprising:
   an optical band pass filter through which the PSA stage II optical signal is passed through after the PSA stage II to remove the pump wavelength and the idler signals to isolate the output WDM optical signal at an output degree of the ROADM.

9. The ROADM of claim 8, wherein the output degree of the ROADM is a drop port.

10. The ROADM of claim 7, wherein the input degree of the ROADM is an add port.

11. The ROADM of claim 7, wherein the first WSS is used to phase tune the PSA stage I optical signal, wherein respective phases of the input WDM optical signal, the pump wavelength, and the idler signal are aligned.

12. The ROADM of claim 11, wherein the respective phases are aligned based on a feedback signal from an optical channel monitor monitoring the output WDM optical signal.

* * * * *